United States Patent
Paladugu et al.

(10) Patent No.: US 11,910,251 B2
(45) Date of Patent: Feb. 20, 2024

(54) CONDITIONAL HANDOVER AND RADIO LINK FAILURE TIMER INTERACTION

(71) Applicant: QUALCOMM Incorporated, San Diego, CA (US)

(72) Inventors: Karthika Paladugu, San Diego, CA (US); Ozcan Ozturk, San Diego, CA (US); Gavin Bernard Horn, La Jolla, CA (US); Punyaslok Purkayastha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/050,308

(22) Filed: Oct. 27, 2022

(65) Prior Publication Data
US 2023/0083669 A1 Mar. 16, 2023

Related U.S. Application Data

(62) Division of application No. 16/995,512, filed on Aug. 17, 2020, now Pat. No. 11,510,112.
(Continued)

(51) Int. Cl.
H04W 36/00 (2009.01)
H04W 76/19 (2018.01)
H04W 24/08 (2009.01)

(52) U.S. Cl.
CPC ....... *H04W 36/0058* (2018.08); *H04W 24/08* (2013.01); *H04W 36/0079* (2018.08);
(Continued)

(58) Field of Classification Search
CPC ....... H04W 36/0058; H04W 36/00837; H04W 36/0079; H04W 36/00835; H04W 36/08;
(Continued)

(56) References Cited

U.S. PATENT DOCUMENTS 10,542,475 B1 1/2020 Singh et al.
2009/0245203 A1* 10/2009 Pani ...................... H04L 1/0026
370/331
(Continued)

OTHER PUBLICATIONS

Intel Corporation: "Failure Handling on CHO", 3GPP Draft, 3GPP TSG RAN WG2 Meeting #106, R2-1906292 CHO Failure, 3rd Generation Partnership Project (3GPP), Mobile Competence Centre, 650, Route Des Luscioles, F06921 Sophia-Antipolis Cedex, France, vol. RAN WG2, May 13, 2019, 4 pages (Year: 2019).*
(Continued)

*Primary Examiner* — Jamal Javaid
(74) *Attorney, Agent, or Firm* — Patterson & Sheridan, L.L.P.

(57) ABSTRACT

Certain aspects of the present disclosure provide techniques for handling a radio link failure timer in the presence of a conditional handover command. A method that may be performed by a user equipment (UE) includes receiving, from a serving cell, a conditional handover command for handing over the UE to a target neighbor cell, wherein the conditional handover command includes one or more triggering conditions for executing a handover to a candidate target cell; monitoring one or more first signals from the candidate target cell for the one or more triggering conditions; and performing one of: stopping a timer based on performing a conditional handover to the target candidate cell; or detecting a timer has expired while monitoring the one or more first signals from the candidate target cell for the one or more triggering conditions.

21 Claims, 9 Drawing Sheets

Related U.S. Application Data

(60) Provisional application No. 62/890,457, filed on Aug. 22, 2019.

(52) U.S. Cl.
CPC ............... *H04W 36/00835* (2018.08); *H04W 36/00837* (2018.08); *H04W 76/19* (2018.02)

(58) Field of Classification Search
CPC . H04W 36/30; H04W 36/14; H04W 36/0022; H04W 36/0055; H04W 76/19; H04W 24/08
See application file for complete search history.

(56) References Cited

U.S. PATENT DOCUMENTS

| | | | | |
|---|---|---|---|---|
| 2019/0387440 | A1* | 12/2019 | Yiu | ............ H04W 36/0072 |
| 2021/0058834 | A1 | 2/2021 | Paladugu | |

OTHER PUBLICATIONS

Ericsson: "Fast RLF Triggering Based on Timer T312", 3GPP Draft, 3GPP TSG-RAN WG2 Meeting #106, R2-1906223—Fast RLF Triggering Based on Timer T312, 3rd Generation Partnership Project (3GPP), Mobile Competence Centre, 650, Route Des Lucioles, F-06921 Sophia-Antipolis Cedex, France, vol. RAN WG2, No. Reno, Nevada, USA, May 13, 2019-May 17, 2019, May 13, 2019 (May 13, 2019), XP051729694, 4 pages, chapter 2.

Intel Corporation: "Failure Handling on CHO", 3GPP Draft, 3GPP Tsg Ran WG2 Meeting #106, R2-1906292 CHO Failure, 3rd Generation Partnership Project (3GPP), Mobile Competence Centre, 650, Route Des Lucioles, F-06921 Sophia-Antipolis Cedex, France, vol. RAN WG2, No. Renot USA, May 13, 2019-May 17, 2019, May 13, 2019 (May 13, 2019), XP051729759, 4 pages, chapter 1t chapter 2.

International Search Report and Written Opinion—PCT/US2020/046815—ISA/EPO—dated Nov. 10, 2020.

International Preliminary Report on Patentability—PCT/US2020/046815, the International Bureau of WIPO—Geneva, Switzerland, dated Mar. 3, 2022.

Oppo: "Discussion on RLM for LTE Mobility Enhancement", 3GPP Draft, 3GPP TSG-RAN WG2 Meeting #107, R2-1909668—Discussion on RLM for LTE Mobility Enhancement, 3rd Generation Partnership Project (3GPP), Mobile Competence Centre, 650, Route Des Lucioles, F-06921 Sophia-Antipolis Cedex, vol. RAN WG2, No. Prague, Czech, Aug. 26, 2019-Aug. 30, 2019, Aug. 16, 2019 (Aug. 16, 2019), XP051767463, 4 pages, chapter 1, chapter 2; table 2.

\* cited by examiner

CONDITIONAL HANDOVER AND RADIO LINK FAILURE TIMER INTERACTION

CROSS-REFERENCE TO RELATED APPLICATIONS

This application is a divisional application of U.S. application Ser. No. 16/995,512, filed Aug. 17, 2020, which claims benefit of and priority to U.S. Provisional Application No. 62/890,457, filed Aug. 22, 2019, which are hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for handling a radio link failure timer in the presence of a conditional handover command.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved handling for radio link failure timers in the presence of a conditional handover command.

Certain aspects provide a method for wireless communication by a user equipment (UE). The method generally includes communicating with a serving cell over a communication link; monitoring at least one of one or more signals from the serving cell or one or more signals from one or more candidate neighbor cells based, at least in part, on one or more measurement events configured in one or more measurement objects; detecting the one or more measurement events based on the monitoring, wherein a timer is configured for the one or more measurement events in the one or more measurement objects; starting the timer based on detecting the one or more measurement events; transmitting a measurement report based on the detected one or more measurement events; receiving a conditional handover command for handing the UE over to a candidate target cell of the one or more candidate neighbor cells, wherein the conditional handover command includes one or more triggering conditions for executing a conditional handover to the candidate target cell; and stopping the timer based on the received conditional handover command.

Certain aspects provide an apparatus for wireless communication by a user equipment (UE). The apparatus generally includes at least one processor configured to: communicate with a serving cell over a communication link; monitor at least one of one or more signals from the serving cell or one or more signals from one or more candidate neighbor cells based, at least in part, on one or more measurement events configured in one or more measurement objects; detect the one or more measurement events based on the monitoring, wherein a timer is configured for the one or more measurement events in the one or more measurement objects; start the timer based on detecting the one or more measurement events; transmit a measurement report based on the detected one or more measurement events; receive a conditional handover command for handing the UE over to a candidate target cell of the one or more candidate neighbor cells, wherein the conditional handover command includes one or more triggering conditions for executing a conditional handover to the candidate target cell; and stop the timer based on the received conditional handover command. The apparatus also generally includes a memory coupled with the at least one processor.

Certain aspects provide an apparatus for wireless communication by a user equipment (UE). The apparatus generally includes means for communicating with a serving cell over a communication link; means for monitoring at least one of one or more signals from the serving cell or one or more signals from one or more candidate neighbor cells based, at least in part, on one or more measurement events configured in one or more measurement objects; means for detecting the one or more measurement events based on the monitoring, wherein a timer is configured for the one or more measurement events in the one or more measurement objects; means for starting the timer based on detecting the one or more measurement events; means for transmitting a measurement report based on the detected one or more measurement events; means for receiving a conditional handover command for handing the UE over to a candidate target cell of the one or more candidate neighbor cells, wherein the conditional handover command includes one or more triggering conditions for executing a conditional handover to the candidate target cell; and means for stopping the timer based on the received conditional handover command.

Certain aspects provide a non-transitory computer-readable medium for wireless communication by a user equipment (UE). The apparatus generally includes instructions that, when executed by at least one processor, cause the at least one processor to: communicate with a serving cell over a communication link; monitor at least one of one or more signals from the serving cell or one or more signals from one or more candidate neighbor cells based, at least in part, on one or more measurement events configured in one or more measurement objects; detect the one or more measurement events based on the monitoring, wherein a timer is configured for the one or more measurement events in the one or more measurement objects; start the timer based on detecting the one or more measurement events; transmit a measurement report based on the detected one or more measurement events; receive a conditional handover command for handing the UE over to a candidate target cell of the one or more candidate neighbor cells, wherein the conditional handover command includes one or more triggering conditions for executing a conditional handover to the candidate target cell; and stop the timer based on the received conditional handover command.

Certain aspects provide a method for wireless communication by a user equipment (UE). The method generally includes receiving, from a serving cell, a conditional handover command for handing over the UE to a target neighbor cell, wherein the conditional handover command includes one or more triggering conditions for executing a handover to a candidate target cell; monitoring one or more first signals from the candidate target cell for the one or more triggering conditions; and performing one of: stopping a timer based on performing a conditional handover to the target candidate cell; or detecting a timer has expired while monitoring the one or more first signals from the candidate target cell for the one or more triggering conditions.

Certain aspects provide an apparatus for wireless communication by a user equipment (UE). The apparatus generally includes at least one processor configured to: receive, from a serving cell, a conditional handover command for handing over the UE to a target neighbor cell, wherein the conditional handover command includes one or more triggering conditions for executing a handover to a candidate target cell; monitor one or more first signals from the candidate target cell for the one or more triggering conditions; and perform one of: stopping a timer based on performing a conditional handover to the target candidate cell; or detecting a timer has expired while monitoring the one or more first signals from the candidate target cell for the one or more triggering conditions. The apparatus also generally includes a memory coupled with the at least one processor.

Certain aspects provide an apparatus for wireless communication by a user equipment (UE). The apparatus generally includes means for receiving, from a serving cell, a conditional handover command for handing over the UE to a target neighbor cell, wherein the conditional handover command includes one or more triggering conditions for executing a handover to a candidate target cell; means for monitoring one or more first signals from the candidate target cell for the one or more triggering conditions; and means for performing one of: stopping a timer based on performing a conditional handover to the target candidate cell; or detecting a timer has expired while monitoring the one or more first signals from the candidate target cell for the one or more triggering conditions.

Certain aspects provide a non-transitory computer-readable medium for wireless communication by a user equipment (UE). The apparatus generally includes instructions that, when executed by at least one processor, cause the at least one processor to: receive, from a serving cell, a conditional handover command for handing over the UE to a target neighbor cell, wherein the conditional handover command includes one or more triggering conditions for executing a handover to a candidate target cell; monitor one or more first signals from the candidate target cell for the one or more triggering conditions; and perform one of: stopping a timer based on performing a conditional handover to the target candidate cell; or detecting a timer has expired while monitoring the one or more first signals from the candidate target cell for the one or more triggering conditions.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for handling a radio link failure timer in the presence of a conditional handover command. For example, a conditional handover is a type of handover in which the serving cell provides the UE with a handover command that includes one or more triggering conditions for autonomously initiating a handover to a candidate neighbor cell. However, it is currently unspecified how conditional handovers should interact with the radio link failure (RLF) timers. Thus, aspects of the present disclosure provide techniques for handling an RLF timer (e.g., starting, stopping, expiry behavior) in the presence of a conditional handover command.

As noted, the following description provides examples of handling a radio link failure timer in the presence of a conditional handover command in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
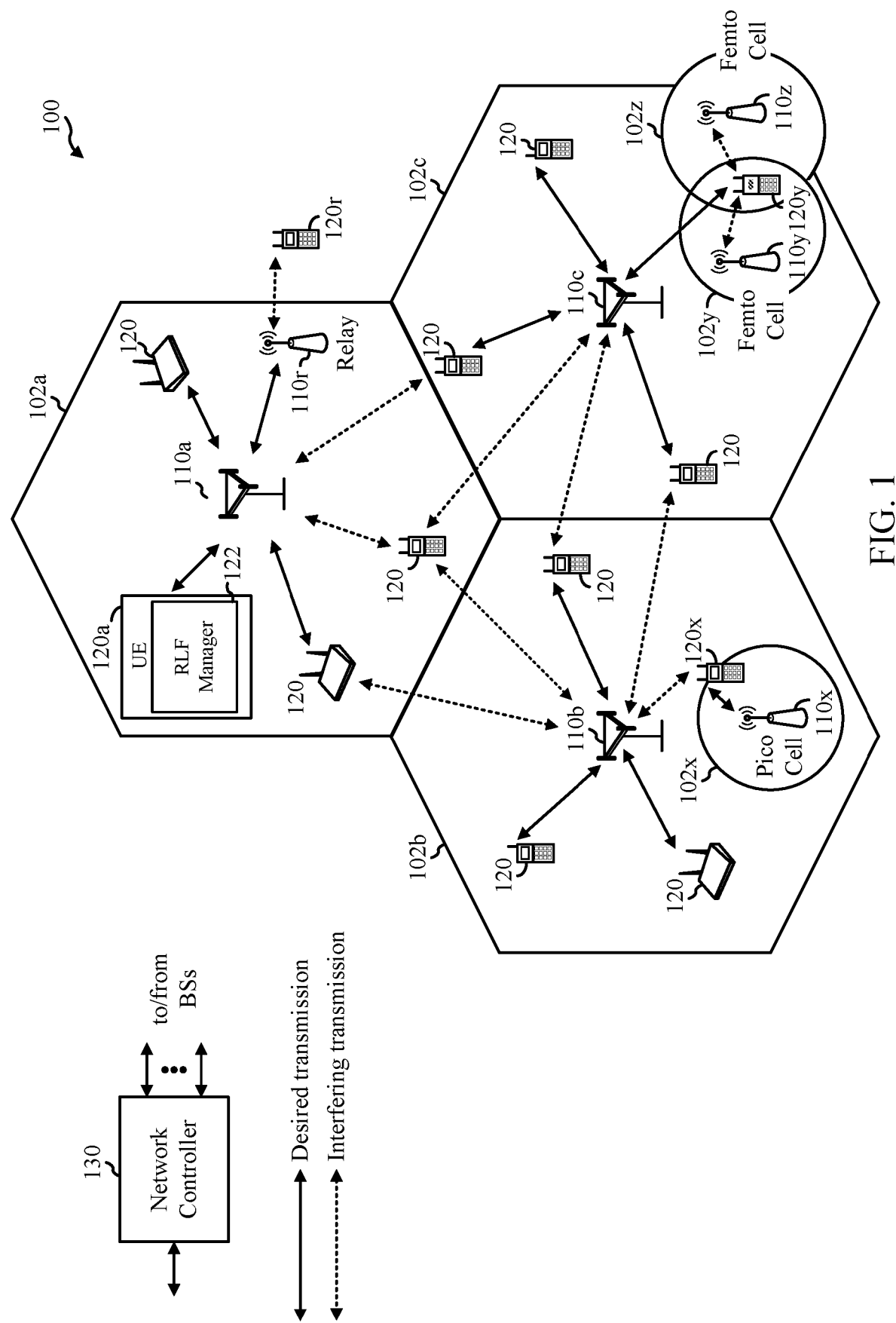
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and/or UEs 120 may be configured for handling a radio link failure (RLF) timer in the presence of a conditional handover command as explained below. For example, as shown in FIG. 1, the UE 120a includes an RLF manager 122. The RLF manager 122 may be configured, in some cases, to perform the operations illustrated in one or more of FIGS. 4-7 as well as other operations described herein for handling a radio link failure timer in the presence of a conditional handover command, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
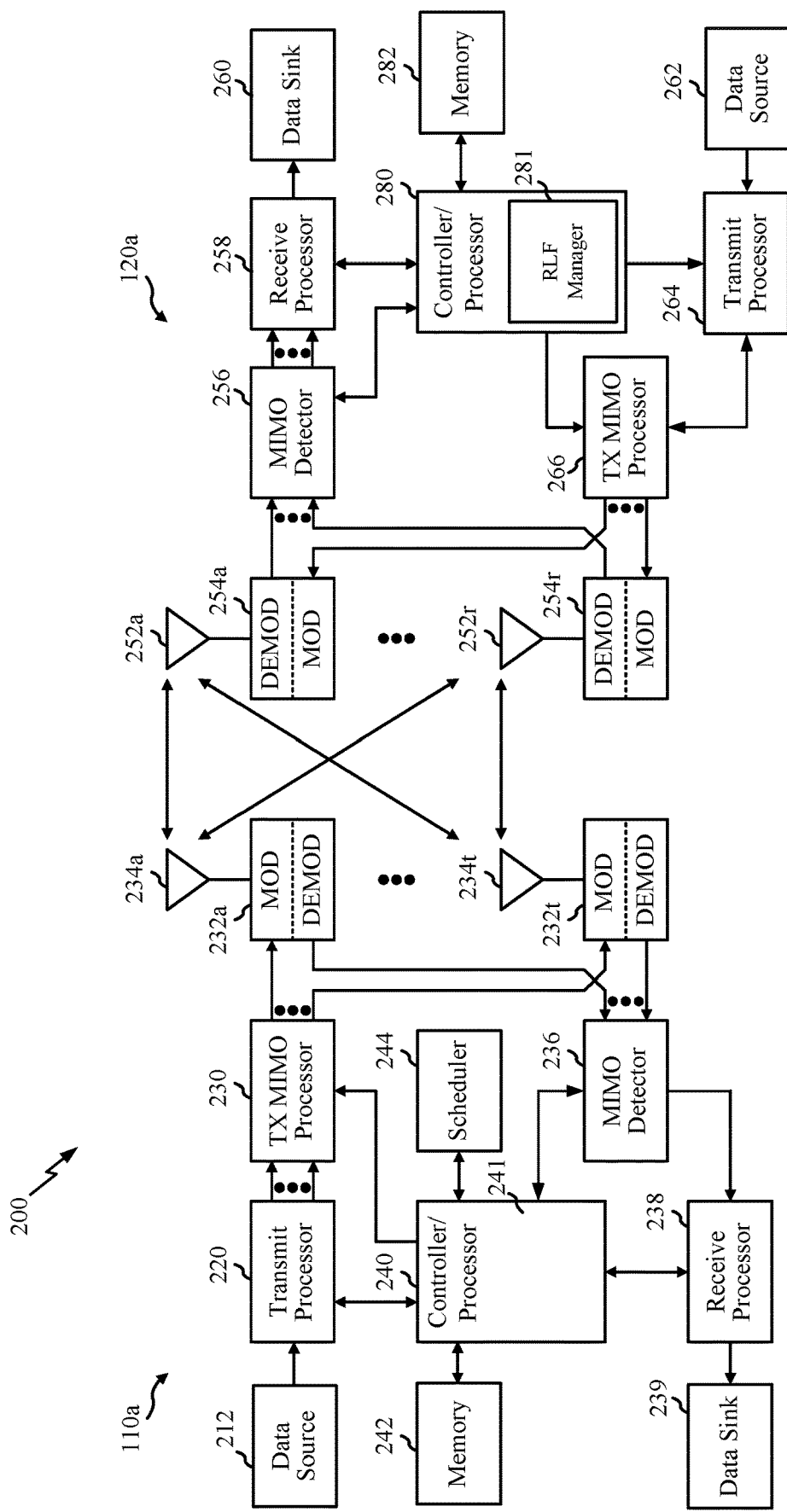
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein for handling a radio link failure timer in the presence of a conditional handover command. For example, as shown in FIG. 2, the controller/processor 280 of the UE 120a includes an RLF manager 281 that may be configured for performing the operations illustrated in one or more of FIGS. 4-7 as well as other operations described herein for handling a radio link failure timer in the presence of a conditional handover command, according to aspects described herein. Although shown at the Controller/Processor, other components of the UE 120a and BS 110a may be used performing the operations described herein.

Example Early Radio Link Failure Detection

In certain cases, a radio link between a UE 120 and a base station 110 may deteriorate to the point that effective communication between the UE 120 and the base station 110 are terminated. In this case, the base station may drop context information for the UE and the UE may perform a radio link failure (RLF) procedure. The RLF procedure may involve establishing a new radio connection with a neighboring base station. The new neighboring base station may attempt to obtain the context information from the previous serving station. However, if the previous base station has dropped the context information, the neighboring base station's request may fail and a delay may be incurred while the new base station and the UE reestablish a new context. Thus, to avoid such delay, an early RLF detection mechanism has been introduced to allow a UE to detect that an RLF is imminent and handover to the neighboring base station before the RLF occurs.

Figure 3:
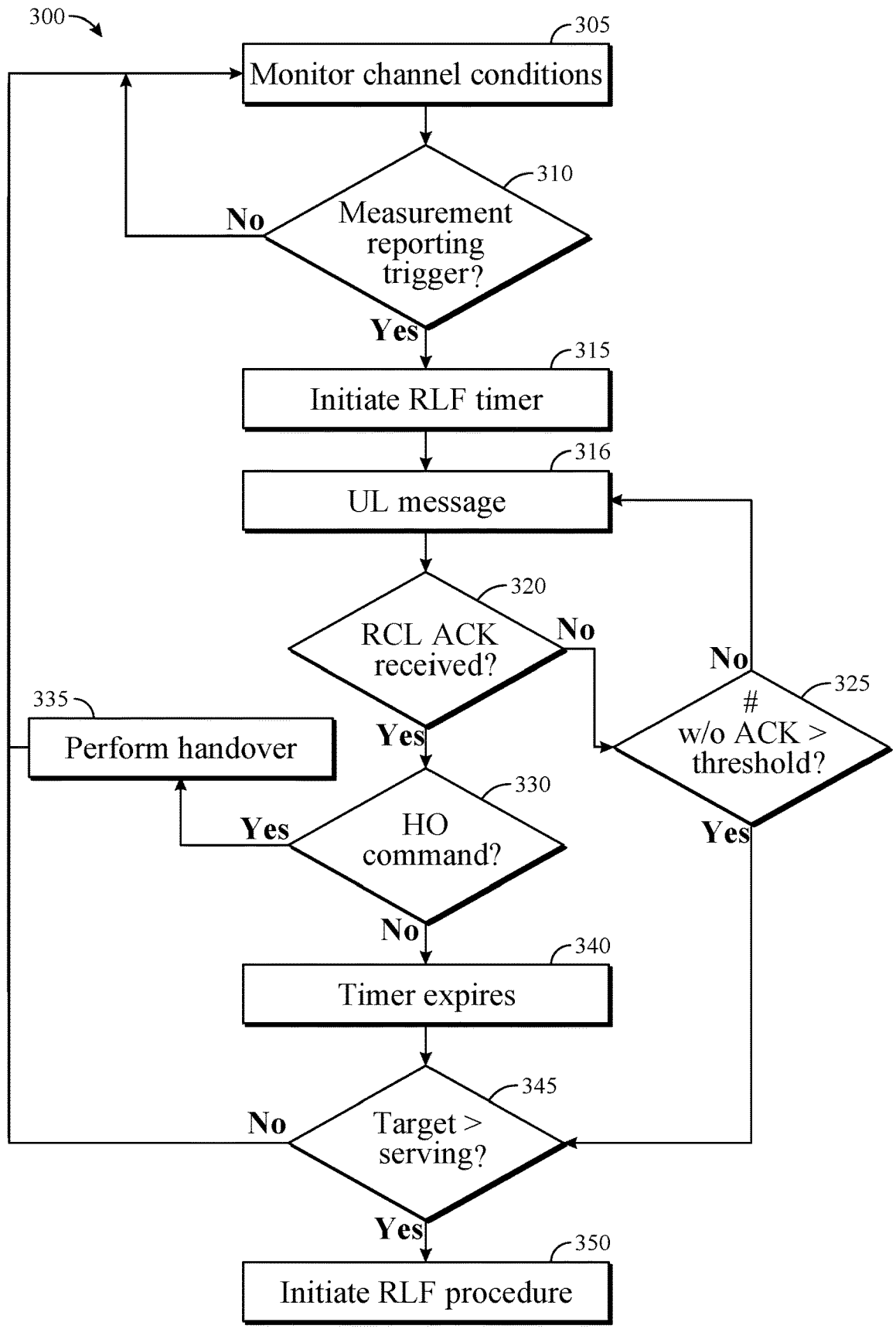
FIG. 3 illustrates an example of a decision flow for early RLF declaration in accordance with aspects of the present disclosure.

FIG. 3 illustrates an example of a decision flow 300 for early RLF declaration in accordance with aspects of the present disclosure. Decision flow 300 may represent steps performed by a UE 120 as described with reference to FIGS. 1-2.

At step 305, a UE 120 may monitor the channel conditions of a serving cell and one or more neighbor cells. For example, the UE 120 may receive a measurement configuration from a base station 110 as part of an RRC configuration message indicating a set of neighbor cells to monitor. During the monitoring, the UE 120 may measure values of the serving cell and one or more cells from the set of neighbor cells, the values corresponding to one or more channel parameters of the cells.

At step 310, the UE may identify a measurement reporting trigger, such as an measurement report message (MRM) trigger event that has occurred or been triggered. In some examples, the measurement reporting trigger is an A1, A2, A3, A4, A5, B1, or B2 event in a measurement configuration of the UE.

For example, in some cases, a first measurement reporting trigger (e.g., A1) may occur when the serving cell becomes better than a threshold; a second measurement reporting trigger (e.g., A2) may occur when the serving cell becomes worse than a threshold; a third measurement reporting trigger (e.g., A3) may occur when a neighbor cell becomes better than the primary serving cell by an offset value; a second measurement reporting trigger (e.g., A4) may occur when a neighbor cell becomes better than a threshold; a fifth measurement reporting trigger (e.g., A5) may occur when the primary serving cell becomes worse than a threshold and a neighbor cell is simultaneously better than another (e.g., higher) threshold; a sixth measurement reporting trigger (e.g., A6) may occur when a neighbor cell becomes better than a secondary serving cell by an offset value; a seventh measurement reporting trigger (e.g., B1) may occur when a neighbor using a different radio access technology (RAT) becomes better than a threshold; and an eighth measurement reporting trigger (e.g., B2) may occur when a primary serving cell becomes worse than a threshold and the inter-RAT neighbor becomes better than another threshold.

In some examples, if the UE 120 identifies a measurement report trigger, at step 315 the UE 120 may initiate a first RLF timer (e.g., a T310 timer) based on an MRM trigger.

At step 316, the UE 120 may transmit an UL message, such as an MRM or other UL radio link signaling message, based on the MRM trigger. The RLF timer may be used in conjunction with, or independent of, other timers used for declaration of RLF. For example, in some cases, a T310 timer may be triggered based on detection of a PHY layer problem at the serving cell (e.g., when a number of out-of-sync indications reaches a threshold). A T312 timer may be another example of a timer that may be used in conjunction with the RLF timer. For example, the T312 timer may be started/triggered when T310 is running and an MRM is sent to the serving cell based on a measurement report trigger/identity for which a T312 has been configured (e.g., A1, A2, A3, A4, A5, B1, or B2 event identities). In some cases, since the T310 timer may be relatively long, the T312 timer may be used to facilitate faster RLF recovery, for example, by allowing earlier expiry of the T310 timer.

At step 330, the UE 120 may detect whether a radio link condition indicative of an RLF has been satisfied, the determination prompted by the identified measurement reporting trigger. For example, this determination may be based on a determination of whether an RLC layer ACK for the UL message has been received, such as an RLC layer ACK in response to one or more MRMs or other UL radio link signaling messages. In various examples, if an RLC layer ACK is not received, it may be an indication that channel conditions for the serving cell have deteriorated significantly.

Even if an RLC layer ACK is received—or in some cases if the RLC layer ACK is not received—the UE 120 may otherwise determine that RLF is imminent. For example, at step 330, the UE 120 may wait for a handover command based on the UL radio link signaling message transmission. In some cases, even though an RLC layer ACK is received by the UE 120 (confirming that the serving cell received the MRM), the UE 12 may not receive an ensuing handover command based on a low channel quality for the serving cell.

If the handover command is received, at step 335 the UE 115 may stop the T312 timer and perform the handover as directed. Additionally, the T312 timer may be stopped based on other criteria, such as upon receiving N311 consecutive in-sync indications, upon initiating a connection re-establishment procedure, or expiration of the T310 timer.

If, however, a handover command is not received at step 335, the UE 120 may, at step 340, determine that the RLF timer has expired. This lack of a handover command and the expiration of the RLF timer may satisfy a radio link condition indicative of an RLF.

As an additional or alternative method of determining that RLF is imminent, if at step 320 the RLC layer ACK for the UL message, such as an RLC layer ACK in response to an MRM message or other UL radio link signaling message, is not received, the UE 120 may increment a counter and then determine whether the counter for the number of RLC layer ACKs exceeds a threshold. If the threshold is not exceeded, the UE 120 may retransmit the UL message at step 316 and wait for another RLC layer ACK. But at step 325 if the number of UL messages transmitted without RLC layer ACK exceeds the threshold, the UE 120 may determine that the radio link condition for imminent RLF is satisfied. In some examples, the radio link condition may be further based on a traffic type indication. For example, the length of the RLF timer or other aspects of the radio link condition process may depend on whether the traffic type is a VoLTE traffic type (or another traffic type with a QoS standard).

Some examples may include step 345, where once the UE 120 has detected the condition indicative of a RLF (e.g., based on the RLF timer or the RLC layer ACK threshold); the UE 120 may optionally verify that a channel comparison condition has been satisfied based on a serving cell channel parameter and a target cell channel parameter. In some examples, verifying that the channel comparison condition has been satisfied includes: determining that the serving cell channel parameter is below a first threshold and determining that the target cell channel parameter is above a second threshold. In some examples, verifying that the channel comparison condition has been satisfied includes: determining that the target cell channel parameter exceeds the serving cell channel parameter by an offset value. The verification of the channel comparison condition may serve to ensure that channel conditions have not recovered at the serving cell or deteriorated at the target cell during the process of determining that RLF is imminent.

At step 350, if the UE 120 has detected a condition indicative of RLF, and in some examples if the channel comparison condition is also satisfied, the UE 120 may initiate an RLF procedure based at least in part on the detected condition indicative of RLF, and where applicable based on the verification that the channel comparison condition has been satisfied. For example, at step 350 the UE may declare an RLF. In some examples the UE 120 may then initiate a connection re-establishment procedure to establish a connection to the target cell after initiating the RLF procedure, such as after a declared RLF. In some cases, this may be an early RLF declaration that may mitigate any service disruption associated with the transition to the new cell. For example, it may enable the target cell to retrieve context for the UE 120 before the serving cell drops the context.

Conditional Handover and Radio Link Failure Timer Interaction

As noted above, a UE may use one or more timers for radio link failure (RLF) detection and recovery. Such timers may include the T310 timer and the T312 timer. For example, in some cases, the UE may be communicate with a serving cell via a communication link. In certain cases, the UE may trigger the T310 timer based on detection of a PHY layer problem at the serving cell (e.g., the communication link is deteriorating), such as receiving a number of out-of-sync indications reaches a threshold. In some cases, the UE may receive configuration information for one or more measurement objects that include an indication of one or more measurement event triggers configured for the serving cell. Additionally, a timer, such as the T312 timer, may be configured for the one or more measurement event triggers in the one or more measurement objects.

According to aspects, the UE may perform monitoring for the one or more measurement event triggers in the one or more measurement objects and, upon detecting one or more of the measurement event triggers and if the T310 timer is already running, the UE may trigger the T312 timer for a measurement event for which T312 has been configured. In some cases, the UE may detect the one or more event triggers based on measurements performed on one or more signals from the serving cell. Upon detecting the one or more measurement event triggers, the UE may transmit a measurement report. In some cases, the one or more signals may include one or more reference signals, such as one or more channel state information reference signals (CSI-RSs) and/or one or more synchronization signal blocks (SSBs).

According to aspects, the T312 timer may be used to facilitate faster RLF recovery by allowing for early termination of the T310 timer. For example, in certain cases, if the UE fails to receive a response to the transmitted measurement report before expiration of the T312 timer, the UE may declare an RLF and stop the T310 timer. Thereafter, after expiration of the T312 timer, the UE may take one or more actions, such as transitioning to a radio resource control (RRC) idle mode or initiating a connection re-establishment procedure to connect to a neighboring cell.

In some cases, the UE may stop the T312 timer before it expires. For example, the UE may determine to stop the T312 timer before it expires when (1) the UE receives N311 consecutive in-sync indications from lower layers, (2) the UE receives a handover command triggering a handover procedure to a neighbor cell, (3) when a connection re-establishment procedure is initiated, or (4) upon expiry of the T310 timer.

According to aspects, the RLF timers discussed above have traditionally been associated with normal handovers. However, more recently, the concept of a conditional handover has been introduced. A conditional handover is a type of handover in which the serving cell provides the UE with a handover command that includes one or more triggering conditions for autonomously initiating a handover to a candidate neighbor cell. For example, upon receiving a conditional handover command, the UE may begin to monitor one or more candidate neighbor cells. If the UE detects that the one or more triggering conditions have been satisfied with respect to a candidate neighbor cell, the UE may autonomously initiate a handover to that neighbor cell without further assistance from the serving cell.

However, it is currently unspecified how conditional handovers should interact with the RLF timers discussed above. Thus, aspects of the present disclosure provide techniques for handling an RLF timer (e.g., starting, stopping, expiry behavior) in the presence of a conditional handover command. In some cases, techniques for handling an RLF timer in the presence of a conditional handover may depend, for example, on whether the UE has already been configured with a conditional handover upon triggering of the RLF timer. Thus, aspects of the present disclosure provide techniques for handling the case where no conditional handover configuration is active in the UE before triggering of the RLF timer. Additionally, aspects of the present disclosure provide techniques for handling the case where there is a conditional handover configuration active in the UE before the triggering of the RLF timer.

For example, in some cases, an RLF timer, such as a T312 timer, may be started similar to LTE legacy behavior (e.g., upon triggering a measurement report for a measurement identity for which the T312 timer has been configured, while the T310 timer is running) even when the measurement report is triggered for configuring a conditional handover (e.g., for providing the serving cell with information to configure the conditional handover). Additionally, in some cases, the RLF timer may be started even when a conditional handover has already been configured at the UE and before the conditional handover is executed by the UE, for example, while UE is monitoring the target neighbor cells identified by the conditional handover. According to aspects, in this case, a measurement report may be triggered on the source cell for a measurement identity for which the T312 timer has been configured, while the T310 timer is running.

According to aspects, the RLF timer may be stopped in certain cases. For example, in some cases the UE may stop the RLF timer upon receiving a conditional handover radio resource control (RRC) reconfiguration message. Additionally, in some cases, the RLF timer may be stopped upon execution of the conditional handover command to hand the UE over to a candidate neighbor cell, for example, if the UE is configured by the conditional handover command to monitor for one or more triggering conditions corresponding to the candidate neighbor cell prior to the start of RLF timer.

In some cases, the RLF timer may become expired. According to aspects, in this case, upon expiration of the RLF timer, even when the conditional handover is configured but not executed, the UE may follow legacy LTE T312 timer expiry behavior. For example, if the RLF timer expires and if security is not activated, the UE may take one or more actions, such as entering an idle mode (e.g., RRC IDLE) or may initiate a connection re-establishment procedure to establish a communication link with a candidate neighbor cell.

Figure 4:
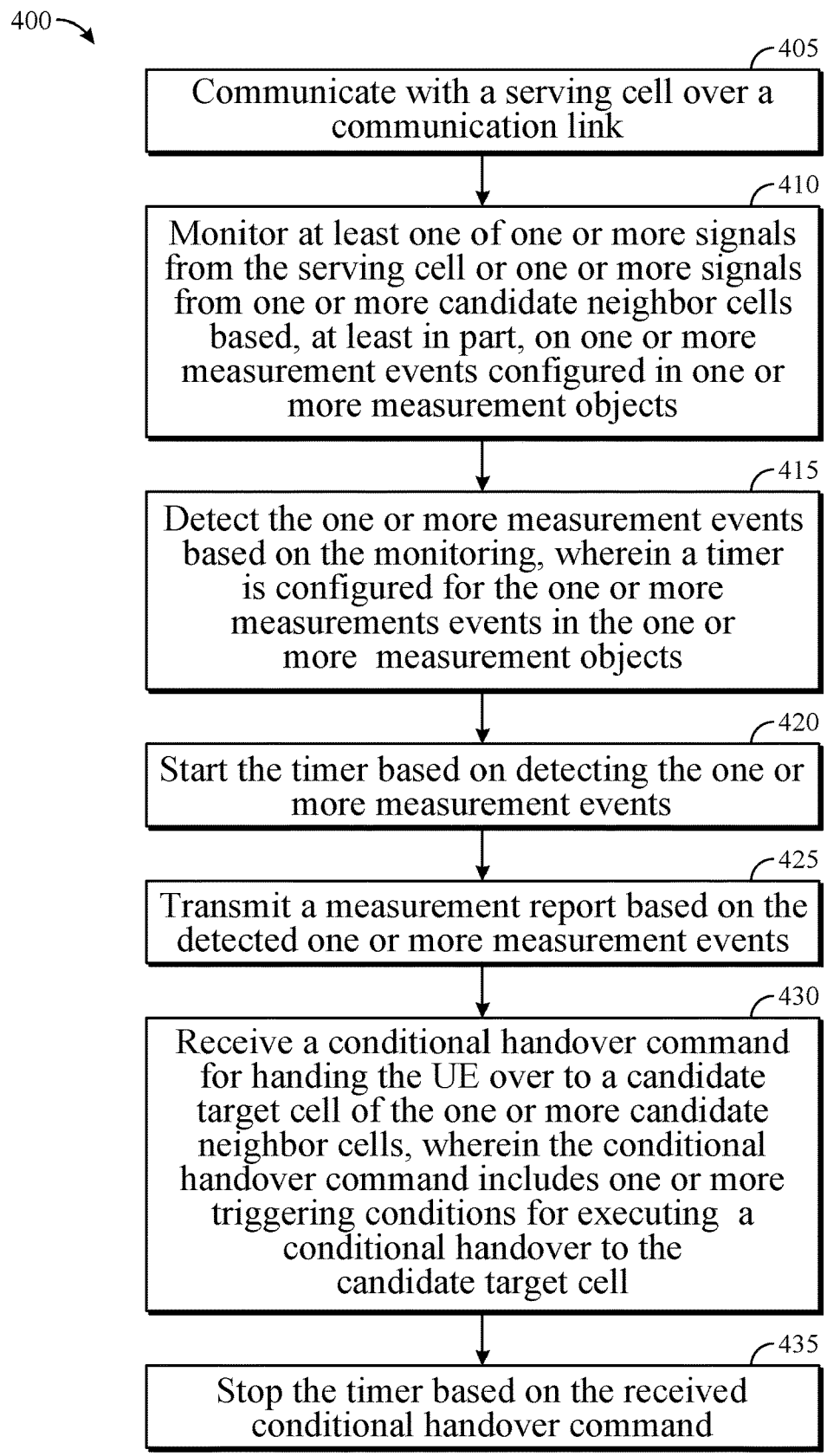
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100) for handling the case where no conditional handover configuration is active in the UE before triggering of the RLF timer. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 405, by communicating with a serving cell over a communication link.

At 410, the UE monitors at least one of one or more signals from the serving cell or one or more signals from one or more candidate neighbor cells based, at least in part, on one or more measurement events configured in one or more measurement objects. For example, in some cases, the UE may receive configuration information that includes one or more measurement objects, indicating the one or more measurement events or measurement event triggers. In some cases, the one or more measurement events may include, for example, one or more of the A1, A2, A3, A4, A5, B1, or B2 event identities discussed above. Additionally, in some cases, the one or more measurement objects may be configured, by the serving cell, for reporting the one or more candidate neighbor cells for at least one of normal handover (HO), make-before-break HO, random access channel (RACH)-less HO, or conditional HO.

At 415 the UE detects the one or more measurement events based on the monitoring, wherein a timer is configured for the one or more measurement events in the one or more measurement objects. In some cases, the timer may be a T312 timer, as discussed above.

At 420, the UE starts the timer based on detecting the one or more measurement events. In some cases, the UE may start the timer when another timer, such as a T310, timer is already running. For example, as noted above, the UE may have previously started the T310 timer in response to detecting that a signal quality associated with the communication link is deteriorating.

At 425, the UE transmits a measurement report based on the detected one or more measurement events. In some cases, the measurement report may include parameters indicating a channel/signal quality associated with the serving cell (e.g., the communication link) and the one or more candidate neighbor cells.

At 430, the UE receives a conditional handover command for handing the UE over to a candidate target cell of the one or more candidate neighbor cells. In some cases, the conditional handover command includes one or more triggering conditions for executing a conditional handover to the candidate neighbor cell.

At 435, the UE stops the timer based on the received conditional handover command.

Additionally, in some cases, stopping the timer may further comprise receiving an indication of a threshold number of in-sync indications. According to aspects, the UE may then stop the timer based on the received indication of a threshold number of in-sync indications.

Additionally, in some cases, stopping the timer may further comprise initiating a handover procedure to hand the UE over to the candidate target cell. In some cases, initiating the handover procedure may be based on a handover command instructing the UE to handover to the candidate target cell. In response, the UE may stop the timer based on the initiated handover procedure.

Additionally, in some cases, stopping the timer may further comprise initiating a connection re-establishment procedure to re-establish the communication link. According to aspects, in response, the UE may stop the timer based on the initiated connection re-establishment procedure.

Additionally, in some cases, stopping the timer may comprise determining that a second timer is expired. In some cases, the second timer may comprise a T310 timer. According to aspects, based on expiration of the T310 timer, the UE may stop the T312 timer.

Figure 5:
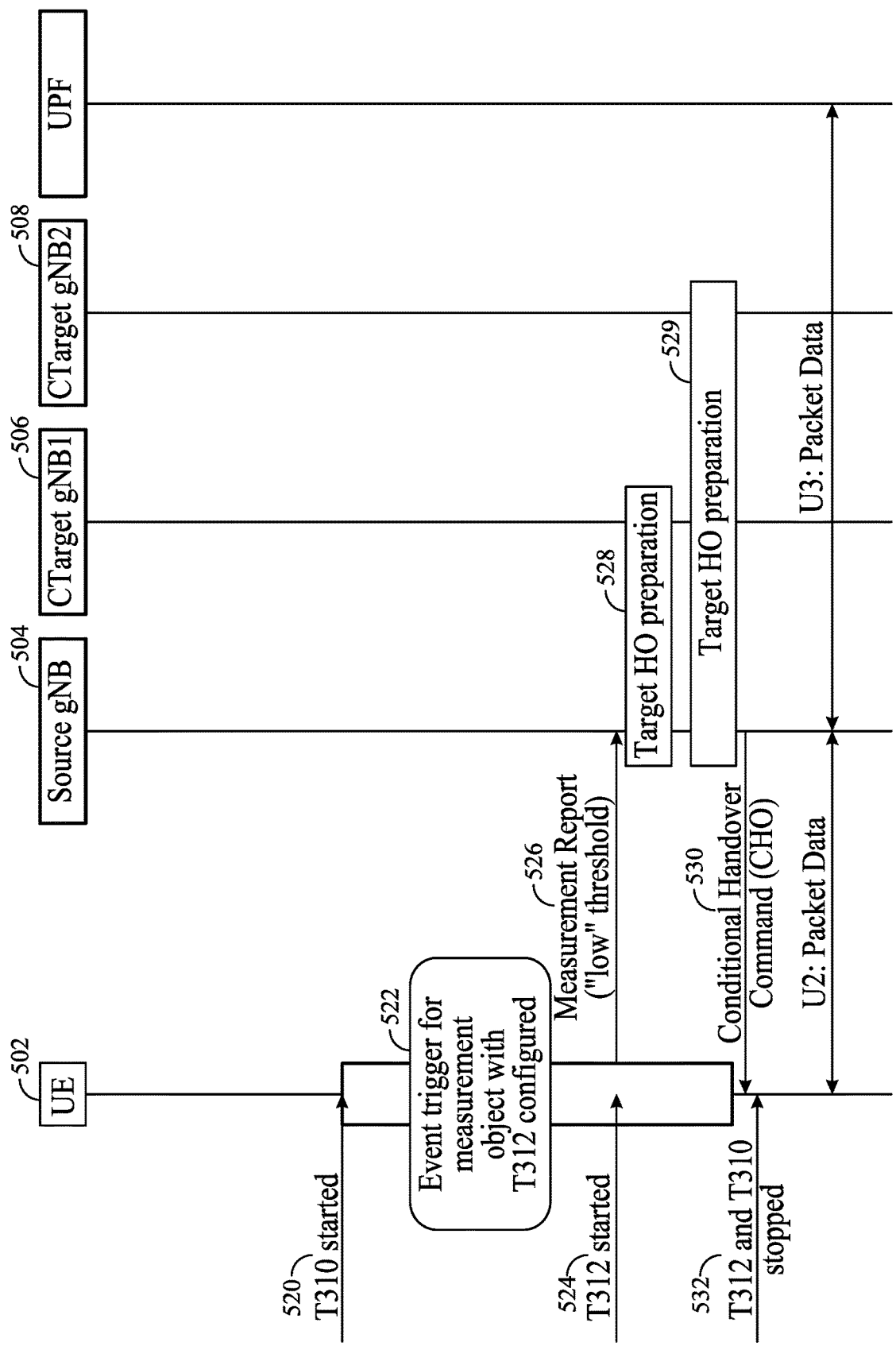
FIG. 5 illustrates a call-flow diagram showing example operations for handling the case where no conditional handover configuration is active in the UE before triggering of the RLF timer, in accordance with certain aspects of the present disclosure.

FIG. 5 illustrates a call-flow diagram showing example operations for handling the case where no conditional handover configuration is active in the UE before triggering of the RLF timer, according to certain aspects presented herein.

According to aspects, while not explicitly illustrated in FIG. 5, a UE 502 may communicate with a serving cell 504 (e.g., source gNB) over a communication link. In some cases, the UE 502 and serving cell 504 may comprise the UE 120 and BS 110, respectively, discussed above. At some point in time, the UE 502 may detect that a signal quality associated with the communication link is deteriorating and may start a T310 timer, as illustrated at 520. According to aspects, after starting the T310 timer at 520, the UE 502 may monitor at least one of one or more signals from the serving cell 504 or one or more signals from one or more candidate neighbor cells (e.g., candidate neighbor cell 506 and candidate neighbor cell 508, also known as candidate target cells) based, at least in part, on one or more configured measurement events in one or more received measurement objects. Based on the monitoring, the UE 502 may detect one or more measurement events (e.g., one or more measurement event triggers) at 522. In some cases, a second timer, such as a T312 timer, may be configured for the one or more measurement events in the one or more measurement objects.

According to aspects, the UE may start the T312 timer at 524 and transmit a measurement report at 526 based on detecting the one or more measurement events.

Thereafter, as shown at 528 and 529, based on the measurement report, the serving cell 504 may prepare a conditional handover command for handing the UE over to a candidate target cell of the one or more candidate neighbor cell, such as the candidate neighbor cell 506 or candidate neighbor cell 508. In some cases, preparing the conditional handover command may include preparing the candidate target cell for the handover, for example, by transmitting UE context information to the candidate cell (e.g., as illustrated at 528 and 529). In some cases, the conditional handover command includes one or more triggering conditions for executing a conditional handover to the candidate neighbor cell. Additionally, in some cases, the conditional handover command may include information for accessing the candidate target cell.

Thereafter, at 530, the serving cell 504 may transmit the conditional handover command to the UE 502. In some cases, the conditional handover command may be transmitted/received in an RRC reconfiguration message.

According, in response to receiving the conditional handover command, the UE may stop the T312 timer and the T310 timer at 532. Additionally, the UE may stop the T312 timer in other circumstances, such as (1) receiving an indication of a threshold number of in-sync indications, (2) receiving a handover command and initiating a handover procedure to hand the UE over to the candidate target cell, (3) initiating a connection re-establishment procedure to re-establish the communication link, or (4) upon the expiration of the T310 timer.

According to aspects, the operations illustrated in FIG. 5 illustrate that the T312 timer may be started due to a measurement event trigger for a measurement object configured for normal HO reporting or conditional handover cell reporting that have T312 configured. According to aspects, the T312 timer may be reset if another measurement report is triggered for any of the T312 configured measurement objects while T312 is running.

Figure 6:
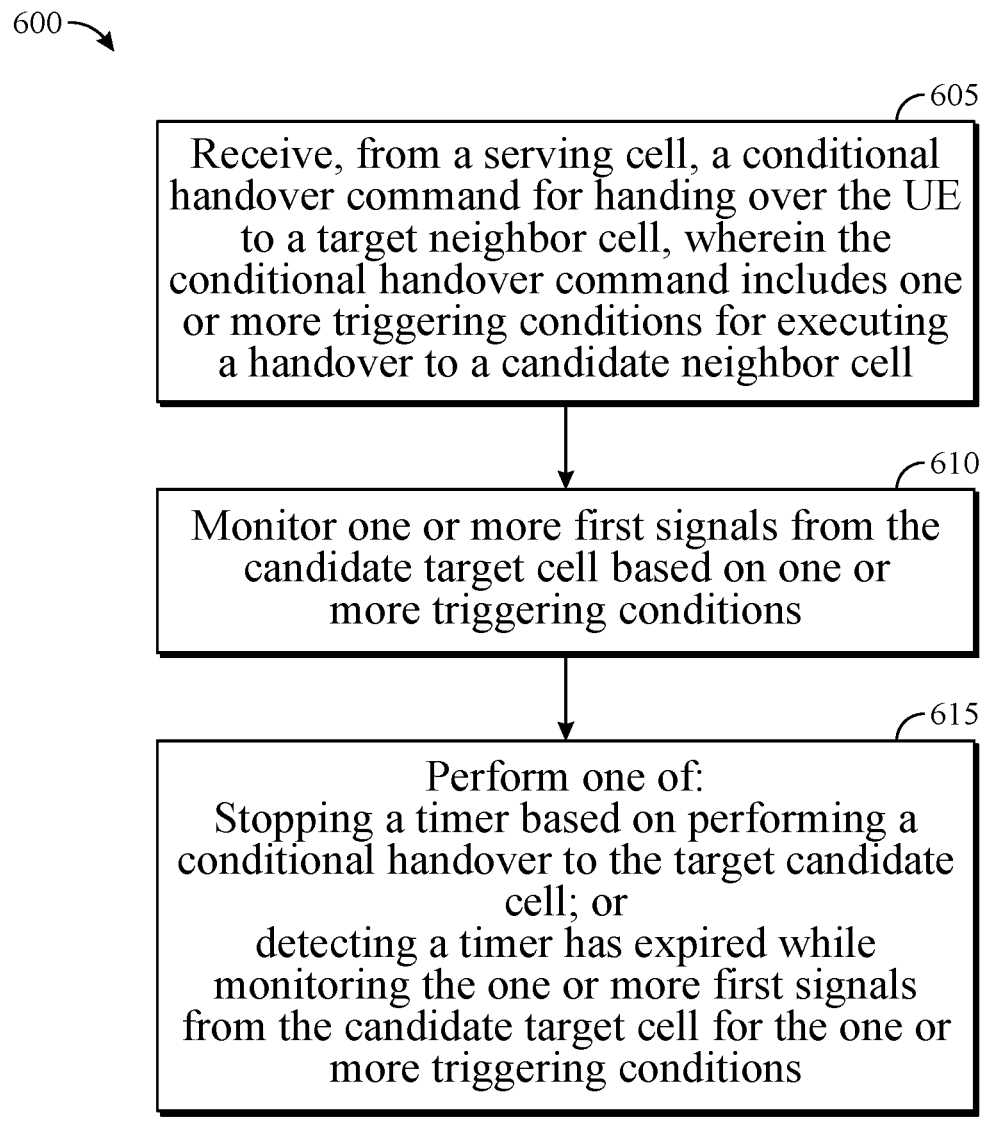
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., such as a UE 120a in the wireless communication network 100) for handling the case where there is conditional handover configuration active in the UE before the triggering of the RLF timer. Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at 605, by receiving, from a serving cell, a conditional handover command for handing over the UE to a target neighbor cell, wherein the conditional handover command includes one or more triggering conditions for executing a handover to a candidate neighbor cell.

At 610, the UE monitors one or more first signals from the candidate target cell for the one or more triggering conditions.

At 615, the UE performs one of stopping a timer based on performing a conditional handover to the target candidate cell or detecting a timer has expired while monitoring the one or more first signals from the candidate target cell for the one or more triggering conditions. In some cases, the timer may comprise a T312 timer.

For example, in some cases, stopping the timer may include detecting that at least one of the one or more triggering conditions are satisfied based on the monitored one or more first signals. Thereafter, the UE may performing a conditional handover to the candidate target cell based on detecting that at least one of the one or more triggering conditions are satisfied. According to aspects, the UE may then stop the timer based on performing the conditional handover to the candidate target cell.

According to aspects, if the UE detects that the timer has expired while monitoring the one or more first signals from the candidate target cell for the one or more triggering conditions, the UE may take one or more actions. For example, in some cases, as the one or more action may comprise at least one of transitioning into an idle mode of operation (e.g., RRC IDLE) or initiating a connection re-establishment procedure to one or more neighbor cells, such as the candidate target cell.

In some cases, operations 600 may further include detecting one or more measurement events based on monitoring for one or more measurement objects configured for the serving cell. In this case, the timer may be configured for the one or more measurement events in the one or more measurement objects. Additionally, in this case, starting the timer may comprise starting the timer after detecting the one or more measurement events but before detecting that the one or more triggering conditions are satisfied. Additionally, in some cases, operations 600 may further include transmitting a measurement report based on the detected one or more measurement events. In some cases, the measurement report may include parameters indicating a channel/signal quality associated with the serving cell (e.g., the communication link) and the one or more candidate neighbor cells.

As noted above, the UE may stop the timer when the conditional handover to the candidate target cell is executed. The UE may also stop the timer in other circumstances. For example, in some cases, stopping the timer may further comprise receiving an indication of a threshold number of in-sync indications. According to aspects, the UE may then stop the timer based on the received indication of a threshold number of in-sync indications.

Additionally, in some cases, stopping the timer may further comprise initiating a handover procedure to hand the UE over to the candidate target cell. In some cases, initiating the handover procedure is based on a handover command instructing the UE to handover to the candidate target cell. In response, the UE may stop the timer based on the initiated handover procedure.

Additionally, in some cases, stopping the timer may further comprise initiating a connection re-establishment procedure to re-establish the communication link. According to aspects, in response, the UE may stop the timer based on the initiated connection re-establishment procedure.

Additionally, in some cases, stopping the timer may comprise determining that a second timer is expired. In some cases, the second timer may comprise a T310 timer. According to aspects, based on expiration of the T310 timer, the UE may stop the T312 timer.

Additionally, in some cases, stopping the timer may comprise receiving a second conditional handover command to configure the UE with one or more other candidate target cells. In response, the UE may stop the timer based on the received second conditional handover command.

Figure 7:
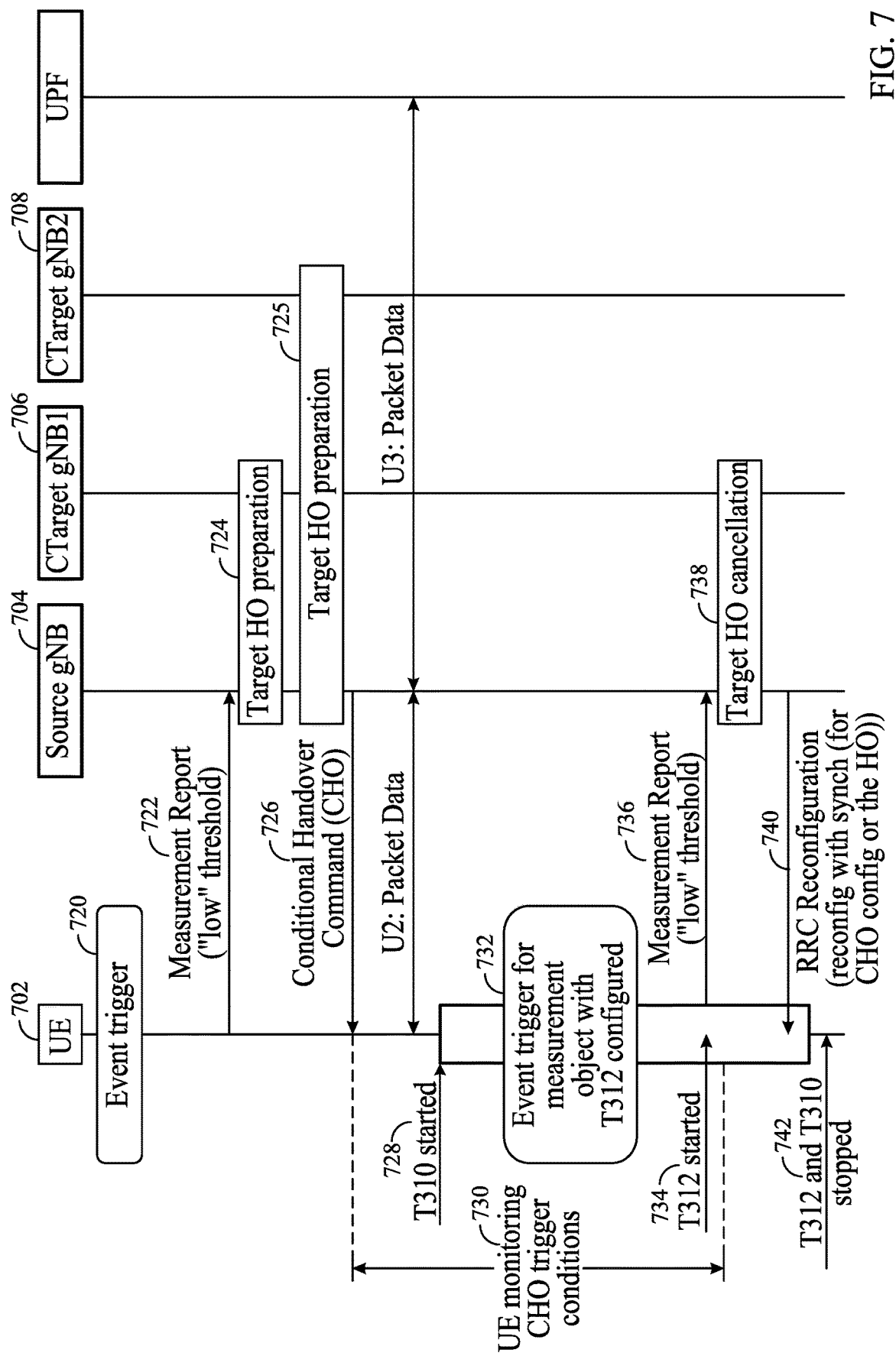
FIG. 7 illustrates a call-flow diagram showing example operations for handling the case where conditional handover configuration is active in the UE before triggering of the RLF timer, in accordance with certain aspects of the present disclosure.

FIG. 7 illustrates a call-flow diagram showing example operations for handling the case where conditional handover configuration is active in the UE before triggering of the RLF timer, according to certain aspects presented herein.

As illustrated, the UE 702 may detect one or more measurement events at 720 and transmit a measurement report at 722 to the serving cell 704 (e.g., source gNB) via a communication link between the UE 702 and the serving cell 704. In some cases, the UE 702 and serving cell 704 may comprise the UE 120 and BS 110, respectively, discussed above.

According to aspects, at 724 and 725, the serving cell may prepare a conditional handover command for handing the UE over to a candidate target cell of the one or more candidate neighbor cells, such as the candidate neighbor cell 706 (e.g., candidate target gNB1) or the candidate neighbor cell 708 (e.g., candidate target gNB2). In some cases, the conditional handover command includes one or more triggering conditions for executing a conditional handover to the candidate target cell. Additionally, in some cases, the conditional handover command may include information for accessing the candidate target cell. Thereafter, as illustrated at 726, the serving cell 704 may transmit the conditional handover command to the UE 702. In some cases, the conditional handover command may be transmitted/received in an RRC Reconfiguration message.

According to aspects, after receiving the conditional handover command, the UE 702 may start a T310 timer at 728 and at 730 begins monitoring one or more first signals from the candidate target cell for the one or more one or more triggering conditions. In some cases, the UE 702 may start the T310 timer at 728 and begin monitoring the one or more first signals from the candidate target cell at 730 based on a detection that a signal quality associated with the communication link between the UE 702 and serving cell 704 is deteriorating.

According to aspects, during monitoring of the one or more first signals from the candidate target cell, the UE 702 may detect one or more measurement events at 732 based on monitoring for one or more measurement objects configured for the serving cell. In some cases, a timer, such as a T312 timer, may be configured for the one or more measurement events in the one or more measurement objects. According to aspects, the UE 702 may then start the timer at 734 based on detecting the one or more measurement events. According to aspects, in some cases, starting the timer may comprise starting the timer after detecting the one or more measurement events but before detecting that the one or more triggering conditions for executing a conditional handover to the candidate target cell are satisfied.

In some cases, the UE 702 may start the timer when another timer, such as a T310, timer is already running, as shown. As noted above, the UE 702 may have previously started the T310 timer at 728 in response to detecting that a signal quality associated with the communication link between the UE 702 and serving cell 704 is deteriorating.

According to aspects, after detecting the one or more measurement events, the UE 702 may transmit at 736 a measurement report to the serving cell 704. In some cases, based on the measurement report, the serving cell 704 may cancel the conditional handover to the candidate target cell (e.g., the candidate target cell 706) as shown at 738 and transmit a second conditional handover command with one or more other candidate target cells as shown at 740. According to aspects, upon receiving the second conditional handover command, the UE 702 may stop the T312 timer and T310 timer at 742.

In some cases, while not illustrated in FIG. 7, the UE 702 may detect that at least one of the one or more triggering conditions received in the (first) conditional handover command are satisfied based on the monitored one or more first signals from the candidate target cell. In this case, the UE 702 may execute/perform a conditional handover to the candidate target cell based on detecting that at least one of the one or more triggering conditions are satisfied. Further, the UE 702 may stop the T312 timer based on performing the conditional handover to the candidate target cell.

In some cases, while not illustrated in FIG. 7, the UE 702 may detect that the timer (e.g., T312 timer) has expired while monitoring the one or more first signals from the candidate target cell for the one or more triggering conditions. In this case, the UE 702 may take one or more actions, such as transitioning into an idle mode of operation (e.g., RRC IDLE) or initiating a connection re-establishment procedure to one or more neighbor cells, such as the candidate target cell.

According to aspects the operations illustrated in FIG. 7 illustrate that the UE may already be configured with a conditional handover received via RRC message and is monitoring the one or more triggering conditions received in the conditional handover command. According to aspects, the T312 timer may be started due to one or more measurement event triggers for a measurement object configured for normal HO reporting or conditional handover cell reporting that have T312 configured, for example, while UE is monitoring the trigger conditions.

Figure 8:
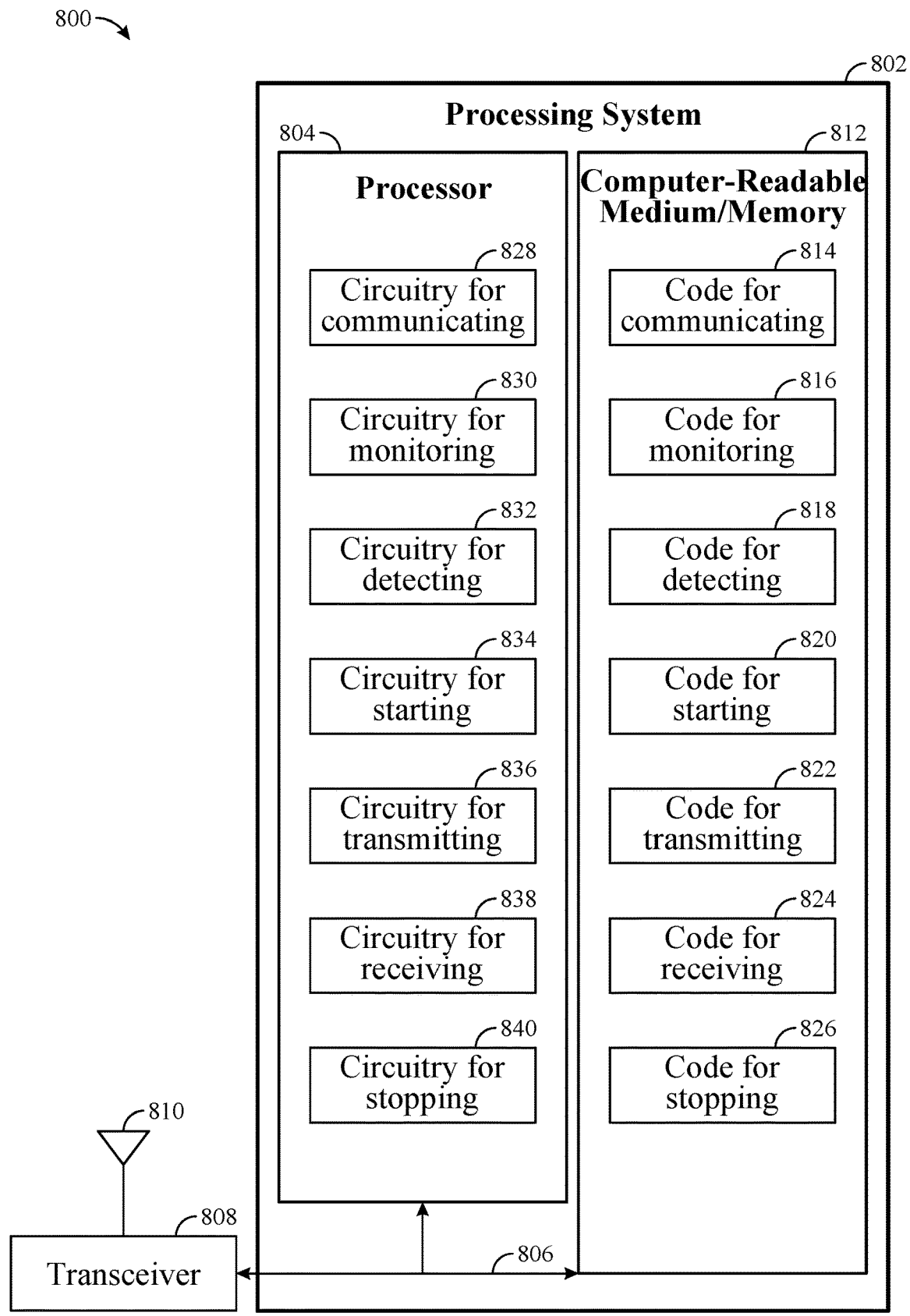
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 4-5. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 4-5, or other operations for performing the various techniques discussed herein for handling a radio link failure timer in the presence of a conditional handover command. In certain aspects, computer-readable medium/memory 812 stores code for performing the operations illustrated in one or more of FIGS. 4-5. For example, computer-readable medium/memory 812 stores code 814 for communicating with a serving cell over a communication link; code 816 for monitoring at least one of one or more signals from the serving cell or one or more signals from one or more candidate neighbor cells based, at least in part, on one or more measurement events configured in one or more measurement objects; code 818 for detecting the one or more measurement events based on the monitoring, wherein a timer is configured for the one or more measurement events in the one or more measurement objects; code 820 for starting the timer based on detecting the one or more measurement events; code 822 for transmitting a measurement report based on the detected one or more measurement events; code 824 for receiving a conditional handover command for handing the UE over to a candidate target cell of the one or more candidate neighbor cells, wherein the conditional handover command includes one or more triggering conditions for executing a conditional handover to the candidate target cell; and code 826 for stopping the timer based on the received conditional handover command.

In certain aspects, the processor 804 may include circuitry configured to implement the code stored in the computer-readable medium/memory 812, such as for performing the operations illustrated in FIGS. 4-5. For example, the processor 804 includes circuitry 828 for communicating with a serving cell over a communication link; circuitry 830 for monitoring at least one of one or more signals from the serving cell or one or more signals from one or more candidate neighbor cells based, at least in part, on one or more measurement events configured in one or more measurement objects; circuitry 832 for detecting the one or more measurement events based on the monitoring, wherein a timer is configured for the one or more measurement events in the one or more measurement objects; circuitry 834 for starting the timer based on detecting the one or more measurement events; circuitry 836 for transmitting a measurement report based on the detected one or more measurement events; circuitry 838 for receiving a conditional handover command for handing the UE over to a candidate target cell of the one or more candidate neighbor cells, wherein the conditional handover command includes one or more triggering conditions for executing a conditional handover to the candidate target cell; and circuitry 840 for stopping the timer based on the received conditional handover command.

Figure 9:
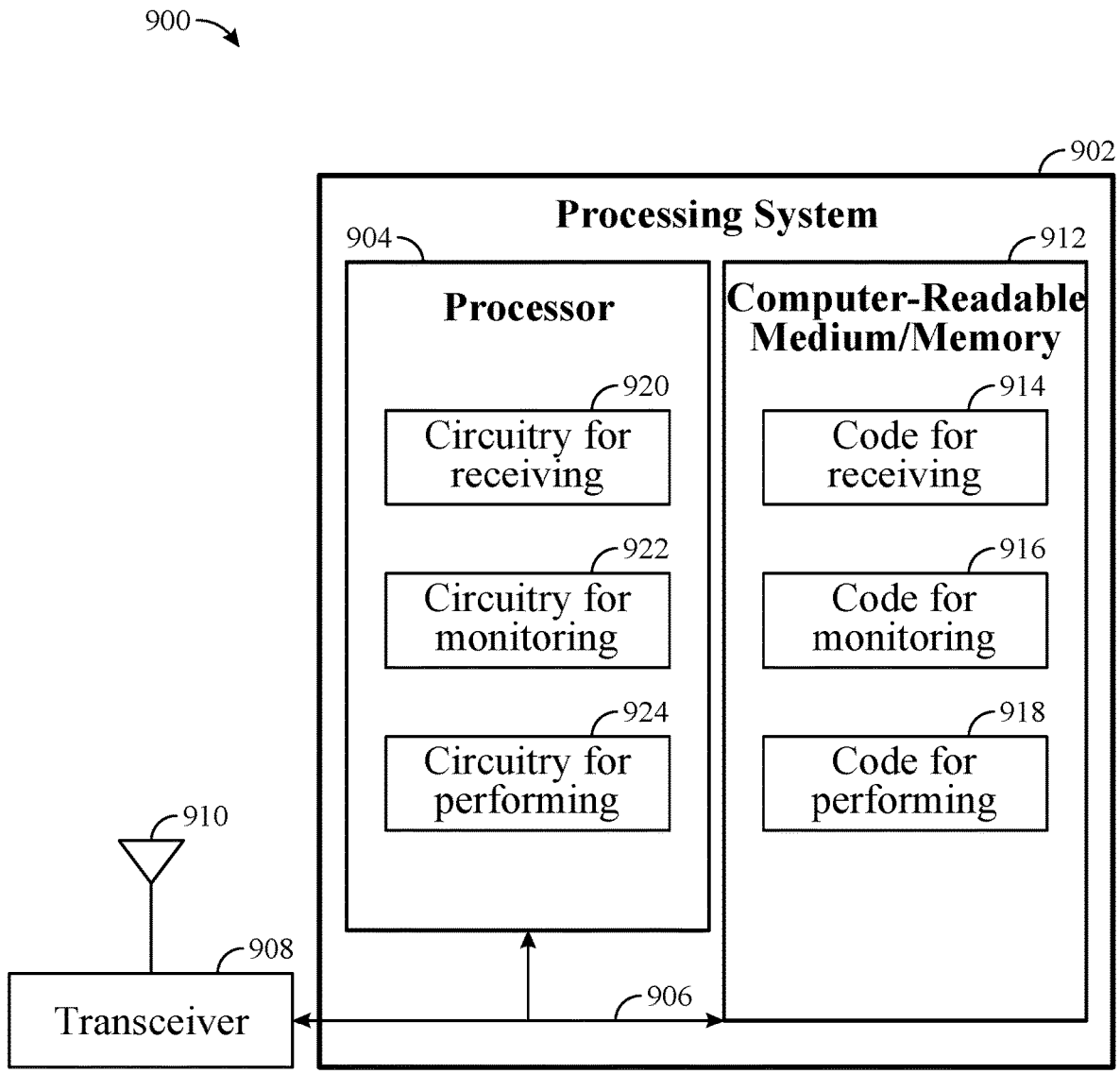
FIG. 9 illustrates a communications device that may include various components configured to perform operations for the techniques disclosed herein in accordance with aspects of the present disclosure.

FIG. 9 illustrates a communications device 900 that may include various components (e.g., corresponding to means-plus-function components) configured to perform operations for the techniques disclosed herein, such as the operations illustrated in FIGS. 6-7. The communications device 900 includes a processing system 802 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 6-7, or other operations for performing the various techniques discussed herein for handling a radio link failure timer in the presence of a conditional handover command. In certain aspects, computer-readable medium/memory 912 stores code for performing the operations illustrated in one or more of FIGS. 6-7. For example, computer-readable medium/memory 912 stores code 914 for receiving, from a serving cell, a conditional handover command for handing over the UE to a target neighbor cell, wherein the conditional handover command includes one or more triggering conditions for executing a handover to a candidate target cell; code 916 for monitoring; and code 918 for performing one of stopping a timer based on performing a conditional handover to the target candidate cell or detecting a timer has expired while monitoring the one or more first signals from the candidate target cell for the one or more triggering conditions.

In certain aspects, the processor 904 may include circuitry configured to implement the code stored in the computer-readable medium/memory 8912, such as for performing the operations illustrated in FIGS. 6-7. For example, the processor 804 includes circuitry 920 for receiving, from a serving cell, a conditional handover command for handing over the UE to a target neighbor cell, wherein the conditional handover command includes one or more triggering conditions for executing a handover to a candidate target cell; circuitry 922 for monitoring; and circuitry 924 for performing one of stopping a timer based on performing a conditional handover to the target candidate cell or detecting a timer has expired while monitoring the one or more first signals from the candidate target cell for the one or more triggering conditions.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a user equipment (UE), comprising:
communicating with a serving cell over a communication link;
monitoring at least one of one or more signals from the serving cell or one or more signals from one or more candidate neighbor cells based, at least in part, on one or more measurement events configured in one or more measurement objects;
detecting the one or more measurement events based on the monitoring, wherein a timer is configured for the one or more measurement events in the one or more measurement objects;
starting the timer based on detecting the one or more measurement events;
transmitting a measurement report based on the detected one or more measurement events;
receiving a conditional handover command for handing the UE over to a candidate target cell of the one or more candidate neighbor cells, wherein the conditional handover command includes one or more triggering conditions for executing a conditional handover to the candidate target cell; and
stopping the timer based on the received conditional handover command, wherein stopping the timer further comprises:
receiving an indication of a threshold number of in-sync indications; and
stopping the timer based on the received indication of a threshold number of in-sync indications.

2. The method of claim 1, wherein stopping the timer further comprises:
initiating a handover procedure to hand the UE over to the candidate target cell; and stopping the timer based on the initiated handover procedure.

3. The method of claim 2, wherein initiating the handover procedure is based on a handover command instructing the UE to handover to the candidate target cell.

4. A method for wireless communication by a user equipment (UE), comprising:
communicating with a serving cell over a communication link;
monitoring at least one of one or more signals from the serving cell or one or more signals from one or more candidate neighbor cells based, at least in part, on one or more measurement events configured in one or more measurement objects;
detecting the one or more measurement events based on the monitoring, wherein a timer is configured for the one or more measurement events in the one or more measurement objects;
starting the timer based on detecting the one or more measurement events;
transmitting a measurement report based on the detected one or more measurement events;
receiving a conditional handover command for handing the UE over to a candidate target cell of the one or more candidate neighbor cells, wherein the conditional handover command includes one or more triggering conditions for executing a conditional handover to the candidate target cell; and
stopping the timer based on the received conditional handover command, wherein stopping the timer further comprises:
initiating a connection re-establishment procedure to re-establish the communication link; and
stopping the timer based on the initiated connection re-establishment procedure.

5. A method for wireless communication by a user equipment (UE), comprising:
communicating with a serving cell over a communication link;
monitoring at least one of one or more signals from the serving cell or one or more signals from one or more candidate neighbor cells based, at least in part, on one or more measurement events configured in one or more measurement objects;
detecting the one or more measurement events based on the monitoring, wherein a timer is configured for the one or more measurement events in the one or more measurement objects;
starting the timer based on detecting the one or more measurement events;
transmitting a measurement report based on the detected one or more measurement events;
receiving a conditional handover command for handing the UE over to a candidate target cell of the one or more candidate neighbor cells, wherein the conditional handover command includes one or more triggering conditions for executing a conditional handover to the candidate target cell; and
stopping the timer based on the received conditional handover command, wherein stopping the timer further comprises:
determining that a second timer is expired; and
stopping the timer based on the expiration of the second timer.

6. The method of claim 5, wherein the second timer comprises a T310 timer.

7. The method of claim 1, wherein the timer comprises a T312 timer.

8. The method of claim 1, wherein the one or more measurement objects are configured, by the serving cell, for reporting the one or more candidate neighbor cells for at least one of normal handover (HO), Make-before-break HO, random access channel (RACH)-less HO, or conditional HO.

9. A processing system for wireless communication by a user equipment (UE), comprising:
one or more processors individually or collectively configured to execute instructions stored on one or more memories and to cause the UE to:
communicate with a serving cell over a communication link;
monitor at least one of one or more signals from the serving cell or one or more signals from one or more candidate neighbor cells based, at least in part, on one or more measurement events configured in one or more measurement objects;
detect the one or more measurement events based on the monitoring, wherein a timer is configured for the one or more measurement events in the one or more measurement objects;
start the timer based on detecting the one or more measurement events;
transmit a measurement report based on the detected one or more measurement events;
receive a conditional handover command for handing the UE over to a candidate target cell of the one or more candidate neighbor cells, wherein the conditional handover command includes one or more triggering conditions for executing a conditional handover to the candidate target cell; and
stop the timer based on the received conditional handover command, wherein, in order to stop the timer, the one or more processors are further configured to:
receive an indication of a threshold number of in-sync indications; and
stop the timer based on the received indication of a threshold number of in-sync indications.

10. The processing system of claim 9, wherein, in order to stop the timer, the one or more processors are further configured to cause the UE:
initiate a handover procedure to hand the UE over to the candidate target cell, wherein initiating the handover procedure is based on a handover command instructing the UE to handover to the candidate target cell; and
stop the timer based on the initiated handover procedure.

11. The processing system of claim 9, wherein the timer comprises a T312 timer.

12. The processing system of claim 9, wherein the one or more measurement objects are configured, by the serving cell, for reporting the one or more candidate neighbor cells for at least one of normal handover (HO), Make-before-break HO, random access channel (RACH)-less HO, or conditional HO.

13. A processing system for wireless communication by a user equipment (UE), comprising:
one or more processors individually or collectively configured to execute instructions stored on one or more memories and to cause the UE to:
communicate with a serving cell over a communication link;
monitor at least one of one or more signals from the serving cell or one or more signals from one or more candidate neighbor cells based, at least in part, on one or more measurement events configured in one or more measurement objects;

detect the one or more measurement events based on the monitoring, wherein a timer is configured for the one or more measurement events in the one or more measurement objects;

start the timer based on detecting the one or more measurement events;

transmit a measurement report based on the detected one or more measurement events;

receive a conditional handover command for handing the UE over to a candidate target cell of the one or more candidate neighbor cells, wherein the conditional handover command includes one or more triggering conditions for executing a conditional handover to the candidate target cell; and stop the timer based on the received conditional handover command, wherein, in order to stop the timer, the one or more processors are further configured to:
initiate a connection re-establishment procedure to re-establish the communication link; and
stop the timer based on the initiated connection re-establishment procedure.

14. The processing system of claim 13, wherein the timer comprises a T312 timer.

15. The processing system of claim 13, wherein the one or more measurement objects are configured, by the serving cell, for reporting the one or more candidate neighbor cells for at least one of normal handover (HO), Make-before-break HO, random access channel (RACH)-less HO, or conditional HO.

16. A processing system for wireless communication by a user equipment (UE), comprising:
one or more processors individually or collectively configured to execute instructions stored on one or more memories and to cause the UE to:
communicate with a serving cell over a communication link;
monitor at least one of one or more signals from the serving cell or one or more signals from one or more candidate neighbor cells based, at least in part, on one or more measurement events configured in one or more measurement objects;
detect the one or more measurement events based on the monitoring, wherein a timer is configured for the one or more measurement events in the one or more measurement objects;
start the timer based on detecting the one or more measurement events;
transmit a measurement report based on the detected one or more measurement events;
receive a conditional handover command for handing the UE over to a candidate target cell of the one or more candidate neighbor cells, wherein the conditional handover command includes one or more triggering conditions for executing a conditional handover to the candidate target cell; and
stop the timer based on the received conditional handover command, wherein, in order to stop the timer, the one or more processors are further configured to:
determine that a second timer is expired; and
stop the timer based on the expiration of the second timer.

17. The processing system of claim 16, wherein the second timer comprises a T310 timer.

18. The processing system of claim 16, wherein the timer comprises a T312 timer.

19. The processing system of claim 16, wherein the one or more measurement objects are configured, by the serving cell, for reporting the one or more candidate neighbor cells for at least one of normal handover (HO), Make-before-break HO, random access channel (RACH)-less HO, or conditional HO.

20. The method of claim 5, wherein the timer comprises a T312 timer.

21. The method of claim 5, wherein the one or more measurement objects are configured, by the serving cell, for reporting the one or more candidate neighbor cells for at least one of normal handover (HO), Make-before-break HO, random access channel (RACH)-less HO, or conditional HO.

* * * * *